United States Patent [19]

Marshall, Jr. et al.

[11] Patent Number: 6,134,634
[45] Date of Patent: Oct. 17, 2000

[54] METHOD AND APPARATUS FOR PREEMPTIVE CACHE WRITE-BACK

[75] Inventors: Robert D. Marshall, Jr., Garland; Jonathan H. Shiell, Plano, both of Tex.

[73] Assignee: Texas Instruments Incorporated, Dallas, Tex.

[21] Appl. No.: 08/994,730

[22] Filed: Dec. 19, 1997

Related U.S. Application Data

[60] Provisional application No. 60/033,544, Dec. 20, 1996.

[51] Int. Cl.$^7$ .................................................. G06F 12/06
[52] U.S. Cl. ..................... 711/143; 711/141; 711/142; 711/144; 711/145; 711/146
[58] Field of Search ................................ 711/3, 133–146, 711/210

[56] References Cited

U.S. PATENT DOCUMENTS

| | | | |
|---|---|---|---|
| 4,530,055 | 7/1985 | Hamstra et al. | 711/113 |
| 5,045,996 | 9/1991 | Barth et al. | 711/143 |
| 5,119,485 | 6/1992 | Ledbetter, Jr. et al. | 711/146 |
| 5,467,460 | 11/1995 | Patel | 711/143 |
| 5,555,398 | 9/1996 | Raman | 711/143 |
| 5,623,633 | 4/1997 | Zeller et al. | 711/146 |
| 5,668,968 | 9/1997 | Wu | 711/3 |
| 5,729,713 | 3/1998 | Leyrer | 711/138 |
| 5,778,430 | 7/1998 | Ish et al. | 711/133 |

FOREIGN PATENT DOCUMENTS 0 273 665 A2   7/1988   European Pat. Off. .

OTHER PUBLICATIONS

D. Bazlen, J. Hajdu and G. Knauft, "Preventive Cast–Out Operations in Cache Hierarchies," IBM Technical Disclosure Bulletin, vol. 23, No. 12, pp. 5426–5427, May 1981.
"Improved Data Cache Reload Performance," IBM Technical Disclosure Bulletin, vol. 32, No. 4B, pp. 244–245, Sep. 1989.

*Primary Examiner*—Do Hyun Yoo
*Assistant Examiner*—Than Nguyen
*Attorney, Agent, or Firm*—Robert D. Marshall, Jr.; W. James Brady, III; Frederick J. Telecky, Jr.

[57] ABSTRACT

A microprocessor preemptively write-backs dirty entries of an internal cache. Each cache entry is checked once each predetermined time period to determine if the cache entry is dirty. If dirty, a write history is checked to determine if the cache entry is stale. If stale, the cache entry in preemptively written back to main memory and then marked as clean. The write history includes a count of the number of consecutive predetermined time periods during which there is no write to the cache entry. The cache entry is stale if the count exceeds a predetermined number. For each check of the write history the nonwrite count is incremented if the cache entry has been written to during the prior cycle and decremented if not. Alternatively, the nonwrite count is set to zero if the cache entry has been written to. The dirty cache entry may be marked as clean upon copying to the write-back buffer or, alternatively, when the write-back buffer writes the dirty cache entry to the main memory. If a write address matches the address of any write-back buffer entry, the matching entry is flushed from the write-back buffer.

28 Claims, 5 Drawing Sheets

METHOD AND APPARATUS FOR PREEMPTIVE CACHE WRITE-BACK

This application claims priority under 35 USC 119(e) (1) of provisional application No. 60/033,544, filed Dec. 20, 1996.

TECHNICAL FIELD OF THE INVENTION

The technical field of this invention is microprocessors that employ internal caches for data.

BACKGROUND OF THE INVENTION

The microprocessors used in current personal computers operate upon data at very high speeds. This is particularly true for superscalar microprocessors that can operate on more than one instruction at a time. It is not economically feasible to construct the entire computer memory system to operate at the same rate as the microprocessor. Further, it is not necessary to construct such a memory system. Microprocessors employ data or instruction caches based upon an assumption of locality. Having once referenced particular data or to a particular instruction from main memory, it is normally the case that nearby data or instructions will be referenced again in the near future. It is feasible to construct a small and fast memory to temporarily store such data or instructions. This small fast memory is called a cache. It is typical to recall data from the main memory in minimum sizes larger than the minimum addressable memory size. Such memory recalls may be via a data bus wider than the minimum addressable data size or via bursts of plural memory accesses or both. Such recall of adjacent data also serves the locality assumption by recalling from nearby addresses that are likely to be referenced in the near future. Memory caches store their data with an indication of the corresponding main memory address.

Each memory reference by the microprocessor is tested against these cache address indications to determine if the referenced address is cached. If the referenced address is stored in the cache, called a cache hit, then the memory access takes place within the cache rather than the main memory. Since memory access to the cache is faster than access to the main memory, each cache hit represents a gain in memory access speed. Note that such memory accesses may be made for both reads of the memory and writes to the memory. If the access is a write, this write takes place in the copy of the data stored in the cache. This cache entry is then marked as dirty. This means that it contains data that differs from the data in the corresponding address in the main memory and the cache data corresponds to the state called for in the current program. If the referenced address is not stored in the cache, called a cache miss, then the main memory must be accessed. In a read access, the microprocessor operation unit needing the data must stall until the data is returned from the slower main memory. When recalled, this main memory data is both supplied to the requesting microprocessor operation unit and stored in the cache. Some microprocessors do not cache data on a cache miss for a write access. These microprocessors merely write to the main memory. In superscalar microprocessors it is likely that other useful tasks may be preformed while this write to main memory takes place. Other microprocessors employ a cache write allocation policy by recalling data on a cache miss for a write access. The data at the memory address to be written is recalled and stored in the cache. The memory write then takes place into the corresponding cache location. This cache entry is marked dirty indicating that the cache entry differs from the copy in the main memory. A write allocation policy is based upon the assumption that the memory location will need to be accessed again a short time for a read or a write following a cache miss write access. If this is true, then the subsequent accesses take place within the cache and increase the speed of memory access.

Whatever the size of the memory cache, the microprocessor will eventually fill it. Upon the next following cache miss, a cache entry must be cleared to enable the missed data from the main memory to be stored. Memory caches typically employ a least recently used algorithm. Along with the corresponding memory address and an indication of whether the cache entry is dirty, the memory cache must store an indication of the last use of the cache entry. The cache entry to be replaced is the least recently used cache entry. This is based upon the assumption that the least recently used cache entry is the least likely to be needed again in the near future.

This cache entry replacement process begins with a cache miss because the requested data is not in the cache. The cache controller must determine which cache entries to replace with the newly required data. If the least recently used cache entry is clean, which is corresponds exactly to the data in the main memory, then this cache entry is overwritten. Because the cache entry is the same as the data stored in the corresponding location in memory, this overwrite does not lose the program state. If the least recently used cache entry is dirty, then the cache entry holds data different from the corresponding memory location. In this case the cache entry holds the program state and overwriting this data would be improper. This cache entry must be evicted, that is, it must be written out to the main memory before the cache entry may be reused.

The need to evict dirty cache entries may cause the microprocessor to stall. This situation occurs only on a cache miss that typically indicates that a microprocessor execution unit requires the data. This situation may occur either on a memory read or on a memory write when using a write allocate policy. However, the requested data from the main memory cannot be stored until the dirty cache entry is written to memory. Thus the microprocessor requires new data but must wait for old data to be written to memory before the new data can be recalled from the memory. It is known in the art to provide a write-back buffer to deal with this problem. The write-back buffer is a first-in-first-out buffer of cache entries that are scheduled to be written to memory. Each entry in the write-back buffer includes the cache entry data and the corresponding main memory address. When the memory bus is free, the data from the last entry in the write-back buffer is written to the main memory at the corresponding address. Upon completion of this write to main memory, a write-back buffer entry is freed to store another evicted cache entry. The write-back buffer enables the required memory write to be delayed until after the memory read. Because a microprocessor operation unit is waiting for the memory read to complete, the advancement of the read before the write permits microprocessor operation to continue past the cache entry eviction.

There are occasions when the assumption of locality of reference fails. One of these times is a context switch when the microprocessor changes from its current task to another task. This may occur when loading a new program, changing between parts of a single program or servicing an interrupt. In these cases memory operation shifts from an original address block to another address block. Such a shift in memory reference requires a large amount of data from the main memory to be cached in a relatively short period. This requires replacement of a large portion of contents of the memory cache. Thus during a context switch large numbers of dirty cache entries may need to be evicted. A write-back buffer only delays the need for writing to memory. Once the write-back buffer is full, then a write-back of a dirty cache entry must occur before any required memory read. In a context switch this situation often occurs repeatedly, slowing the operation of the microprocessor each time.

Increasing the depth of the write-back buffer FIFO tends to reduce this problem. With sufficient depth the write-backs may be delayed until the new task begins to reference cached data. Each time the new task generates a cache hit, a memory bus cycle is not needed to recall the requested data. This frees a memory bus cycle for a write-back from the write-back buffer. The larger the write-back buffer the more likely that the write-backs will be delayed until their required memory bus cycles can be hidden behind cache hits. However, the write-back buffer requires relatively large amounts of area in the integrated circuit embodying the microprocessor. Each entry in the write-back buffer must include an entire cache entry, which may be from 64 bits to 256 bits or more wide. Each entry in the write-back buffer also needs the address of the beginning of the data, which is often 27 to 29 bits. In addition, the address of each entry in the write-back buffer is typically compared with the address of any memory access. The data write-back is generally aborted if the address of a memory access matches any address within the write-back buffer. A match on a memory read means that data within the write-back buffer is needed by an operational unit of the microprocessor. It saves time to obtain this data from the write-back buffer rather than writing it to main memory, generating a cache miss on the read access and then reading it back into the cache. A match on a memory write means that the data within the write-back buffer is to be altered. Thus the data in the write-back buffer will be the wrong data to write to the memory. In addition in either case, an access to data in the write-back buffer means that this data is no longer the least recently used. Thus another cache entry should be replaced rather than the cache entry in the write-back buffer. Because the write-back buffer may stall the microprocessor execution unit needing data, all these compares should be completed in time to allow the clearing of a write-back buffer entry quickly upon a match. This requires lots of parallel hardware for the compares. Because of these circuit complexities, the depth of the write-back buffer is typically set to prevent most microprocessor operation unit stalls during ordinary processing but not during context switches.

SUMMARY OF THE INVENTION

This invention provides of preemptive cache write-back in a microprocessor having an internal cache. The invention checks each cache entry once each predetermined time period to determine if the cache entry is dirty. If a cache entry is dirty, the inventions checks a write history to determine if the cache entry is stale. If the cache entry is stale, the invention preemptively writes the cache entry to main memory and marks the cache entry as clean.

In the preferred embodiment the write history includes a count of the number of consecutive predetermined time periods during which there is no write to the cache entry. The cache entry is stale if the count exceeds a predetermined number. This nonwrite cycle count is set to zero upon each initiation of a cache entry. A write bit is set upon each write to the cache entry. For each check of the write history the nonwrite cycle count is incremented if the corresponding write bit is not set and decremented if the write bit is set. Each check of the write history resets the write bit. The cache entry is determined stale if the nonwrite cycle count exceeds a predetermined number. Alternatively, the nonwrite cycle count is set to zero if the corresponding write bit is set.

The preemptive cache write-back invention preferably employs a FIFO write-back buffer. The state cache entry and its corresponding address is copied to a first entry of buffer. The dirty bit or bits corresponding to this cache entry may also be copied to the write-back buffer. This could be used to enable the write-back buffer to write-back only the dirty part of the cache entry. The output entry of the write-back buffer is written to main memory whenever the main memory is free to accept writes. The dirty cache entry may be marked as clean upon copying to the write-back buffer. Alternatively, dirty cache entry may be marked as clean when the write-back buffer writes the dirty cache entry to the main memory.

Any memory access address is compared to the address of each entry in the write-back buffer. If a write address matches the address of any write-back buffer entry, the matching entry is flushed from the write-back buffer. If the cache entry corresponding to that write-back buffer entry has been marked as clean, it is remarked as dirty. A read reclaim count may allow read reclaim of a write-back buffer entry. The read reclaim count is set zero upon copying the cache entry and its corresponding address to the write-back buffer. If a read address matches the address of any write-back buffer entry, the read reclaim count is incremented. The write-buffer entry is flushed if and only if the read reclaim count does not exceed the predetermined number.

Checking each cache entry once each predetermined time period may include stalling operation of the microprocessor once each predetermining time period and sequentially checking all cache entries. Preferably checking each cache entry occurs in the background during normal processing. Upon counting a predetermined number of instruction cycles the next sequential cache entry is checked. If the microprocessor is reading from or writing to the next sequential cache entry, then the cache entry check stalls until read or write completes.

BRIEF DESCRIPTION OF THE DRAWINGS

These and other aspects of this invention are illustrated in the drawings, in which.

DETAILED DESCRIPTION OF PREFERRED EMBODIMENTS

This invention strives to identify stale data within the cache. Stale data is data that is no longer needed for writes by the microprocessor. This invention then writes-back this stale data before the cache entry needs to be evicted. The data is retained in the cache but now constitutes clean data. Upon a context switch much less data needs to be written to main memory because the identified stale data has already been written to main memory. This serves to anticipate the need for write-backs and place them prior to the memory access peak generated by the context switch. This will tend to reduce the peak memory access requirement enabling better usage of a write-back buffer.

An autonomous state machine or processor preemptively writes-back dirty cache entries. The preemptive cache write-back logic preferably operates only infrequently and only when memory bus activity is low. If active, the preemptive cache write-back logic determines if a cache entry is stale. This employs a write history for the cache entry. If a cache entry is both dirty and stale, it is copied to a write-back buffer. The write-back buffer stores the cache entry data and its address in a queue for writing to the main memory. The corresponding cache entry may be marked as clean upon copying to the write-back buffer or when the write-back buffer actually writes it to main memory.

If nothing else intervenes, then the cache entry in the write-back buffer is written to main memory or an external cache. There are some cases that are better handled differently. If there is a cache hit on a memory read to a write-back pending cache entry, it may be best not to use a memory bus cycle for a cache entry in use. Accordingly, the write-back entry may be flushed. In an alternative embodiment, the write-back buffer entry is flushed for only up to a predetermined number of reads. If the cache entry has been read more than the predetermined number of times without an intervening write, then the corresponding write-back buffer entry is not flushed. In this case the read accesses do not imply anything about whether the program has finished writing to that address. Thus the preemptive cache write-back may continue.

If there is a cache hit on a memory write to a write-back pending cache entry, then the write-back entry is flushed. In this case, the cache entry is no longer stale. It is better not to use a memory bus cycle to write a changed cache entry. This data may be in use again so it is not a good candidate for preemptive write-back.

Figure 1:
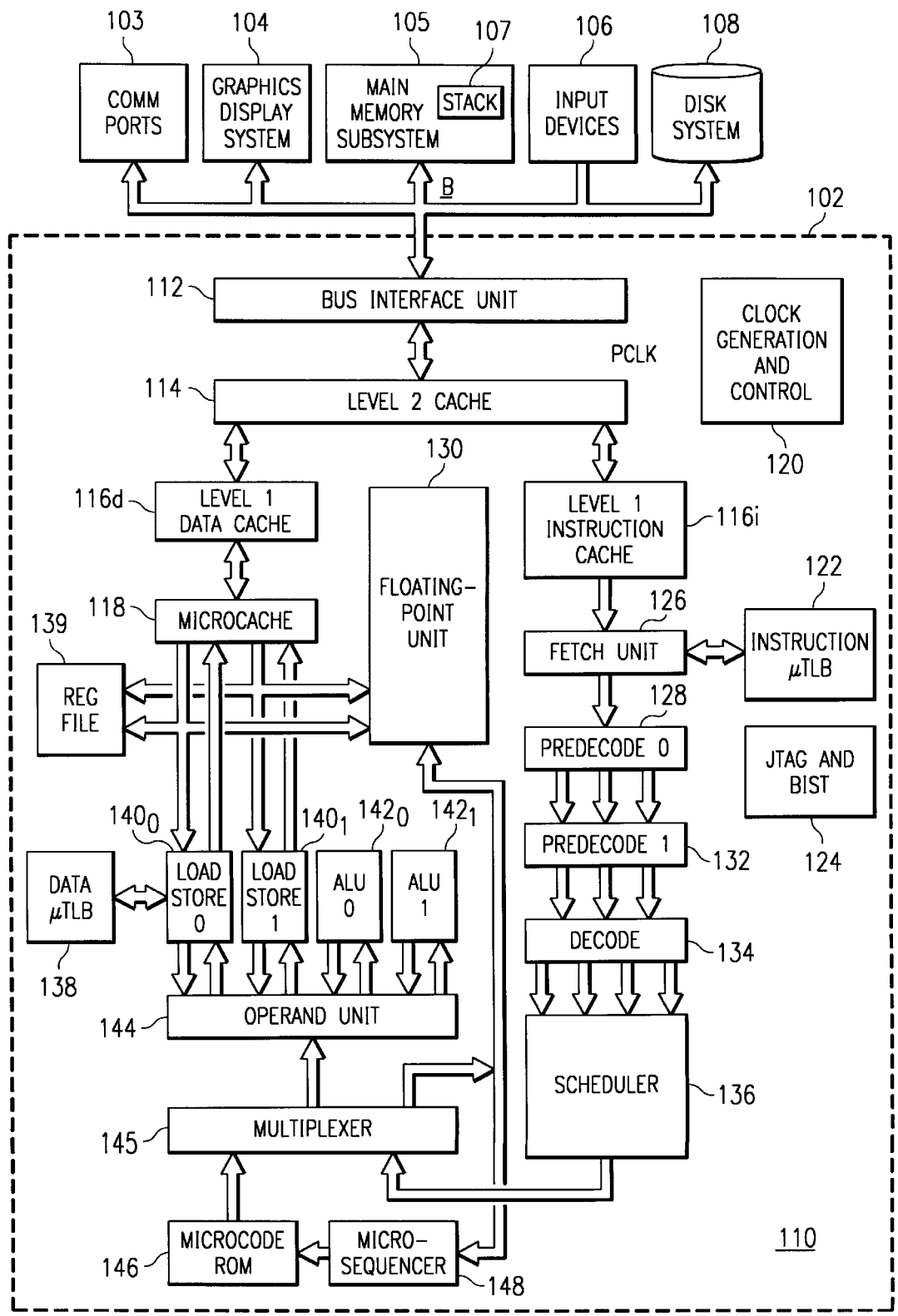
FIG. 1 illustrates in block diagram form the overall architecture of a microprocessor to which this applicable.

FIG. 1 illustrates a block diagram of a microprocessor embodiment into which the embodiments of this invention may be incorporated. Referring now to FIG. 1, an exemplary computer system 102, including an exemplary superscalar pipelined microprocessor 110 within which the preferred embodiment is implemented, will be described. It is to be understood that the architecture of computer system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 1, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. Computer system 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD ROM drives). It is therefore contemplated that computer system 102 of FIG. 1 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit (BIU) 112 that is connected to bus B, and which controls and effects communication between microprocessor 110 and the other elements in computer system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 1, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable." Level 2 cache 114, as shown in FIG. 1, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, which in this example is a fully dual ported cache.

As shown in FIG. 1 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $144_0$, $144_2$ for processing conditional branch, integer, and logical operations, floating point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

- F Fetch: This stage generates the instruction address and reads the instruction from the instruction cache or memory
- PD0 Predecode stage 0: This stage determines the length and starting position of up to three fetched x86 type instructions
- PD1 Predecode stage 1: This stage extracts the x86 instruction bytes and recodes them into fixed length format for decode
- DC Decode: This stage translates the x86 instructions into atomic operations (AOps)
- SC Schedule: This stage assigns up to four AOps to the appropriate execution units
- OP Operand: This stage retrieves the register operands indicated by the AOps
- EX Execute: This stage runs the execution units according to the AOps and the retrieved operands
- WB Write back: This stage stores the results of the execution in registers or in memory Referring back to FIG. 1, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 1, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Figure 2:
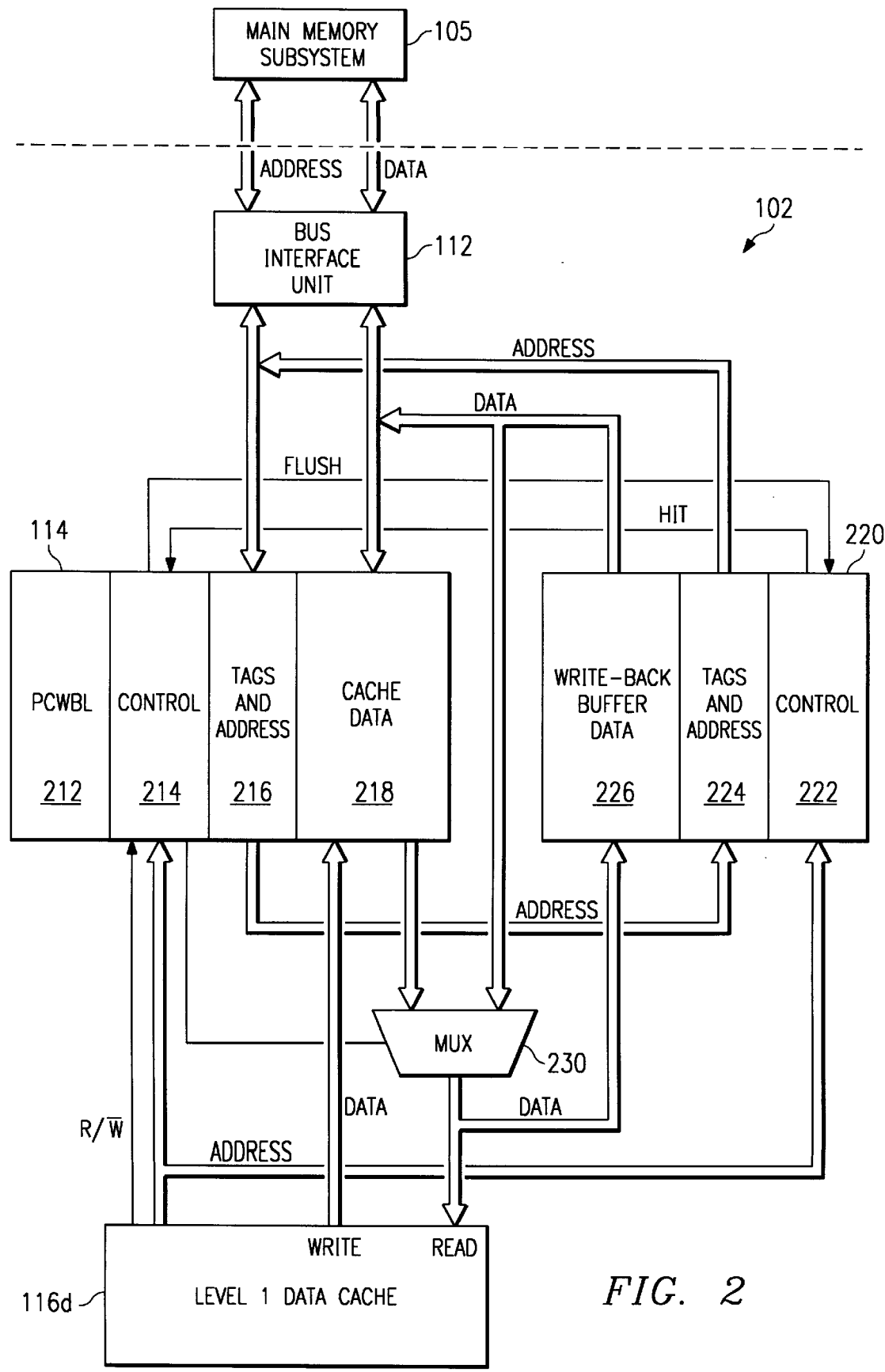
FIG. 2 illustrates in block diagram form the relationship between the bus interface unit, the data cache, a lower level data cache and the write-back buffer according to this invention.

FIG. 2 illustrates the interface between bus interface unit 112, level 2 cache 114 and level 1 data cache $116d$ in further detail illustrating the connections of this invention. FIG. 2 illustrates connections between level 1 data cache $116d$ and level 2 cache 114. Those skilled in the art would recognize that this invention could be practiced with a cache such as level 2 cache 114 illustrated in FIG. 2 directly connected to load-store units $140_0$, $140_1$. The only difference between these embodiments of the invention would be that level 2 cache 114 would need to include dual ports for data access or load-store units $140_0$, $140_1$, would need to share a single data port to level 2 cache 114. FIG. 2 does not illustrate the connections between level 2 cache 114 and level 1 instruction cache $116i$. In the preferred embodiment level 2 cache 114 is a combined data and instruction cache. In the preferred embodiment the connections between level 2 cache 114 and level 1 instruction cache $116i$ are conventional. These connections are not illustrated in FIG. 2 for the sake of brevity.

Level 2 cache 114 includes preemptive cache write-back logic 212, control logic 214, tags and addresses 216 and cache data 218. FIG. 2 further illustrates write-back buffer 220 that includes control logic 222, tags and addresses 224 and write-back buffer data 226. Multiplexer 230 handles selection of data from cache data 218 or write-back buffer data 226 under control of control logic 214 for supply to level 1 data cache $116d$ and write-back buffer data 226.

Figure 3:
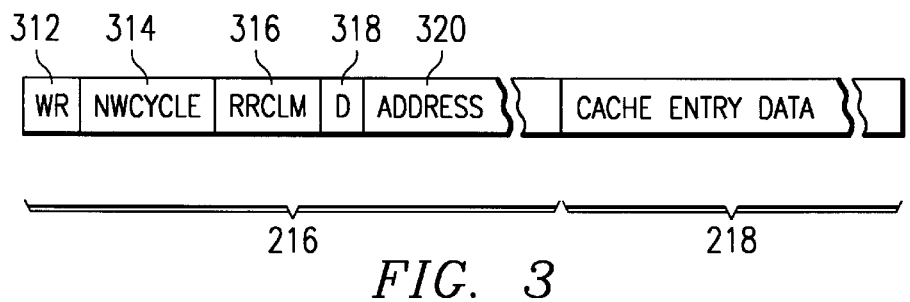
FIG. 3 illustrates the definition of cache entry bits according to a preferred embodiment of this invention.

FIG. 3 illustrates the definitions of the tags and address fields 216 and cache data 218 of a cache entry employed in this invention. Each cache entry within level 2 cache 214 includes a set of tags and address 216 and corresponding cache entry data 218. Note that FIG. 3 omits illustration of other fields normally used, such as a least recently used marker, which are conventional. Tags and address fields 216 includes a write (WR) field 312. The write field 312 preferably consists of a single bit. This write field 312 is reset to 0 upon first use of the cache entry. This field is set to 1 upon any write to the corresponding cache entry data. Control logic 214 handles these operations on write field 312. The write field 312 is reset to 0 each time preemptive cache write-back logic 212 operates on the cache entry. The nonwrite cycle (NWcycle) field 314 preferably consists of 2 or 3 bits. The nonwrite cycle field 314 stores a write history of the corresponding cache entry. The nonwrite cycle field 314 is controlled solely by preemptive cache write-back logic 212 in a manner that will be further explained below. The read reclaim (RRclm) field 316 preferably consists of 1 or 2 bits. The read reclaim field 316 stores a read reclaim history of the corresponding cache entry. The read reclaim field 316 is initially reset to zero upon initiating the cache entry. The read reclaim field 316 is reset to zero by control logic 216 upon each write to the corresponding cache entry. The read reclaim field 316 is employed by preemptive cache write-back logic 212 in a manner that will be further explained below. The dirty (D) field 318 is the conventional dirty field indicating whether the corresponding cache entry has been written to since the last write-back to main memory subsystem 105. As known in the art, the dirty field 318 may be a single bit for the entire cache entry or a plurality of bits, one bit for each minimum addressable data word. Dirty field 318 is controlled solely by control logic 214 but is used by preemptive cache write-back logic 212. Dirty field 318 is initially reset to zero or all zeros. The corresponding bit or bits is set to 1 by control logic 216 upon each write to the corresponding minimum addressable data word of the cache entry. Dirty field 318 is reset to zero or all zeros by control logic 216 upon writing the corresponding data to main memory subsystem 105. Address field 320 is the conventional cache address field. The length of this address field 320 depends upon the address length employed by the microprocessor and the size of cache entry data 218. As an example only, microprocessor 110 may employ 32 bit addresses, each address selecting a byte in main memory subsystem 105 and the length of each cache data entry may be 32 bytes. In this case the address field 320 consists of 27 bits. The cache entry data 218 consists of the corresponding data of the cache entry.

Figure 4:
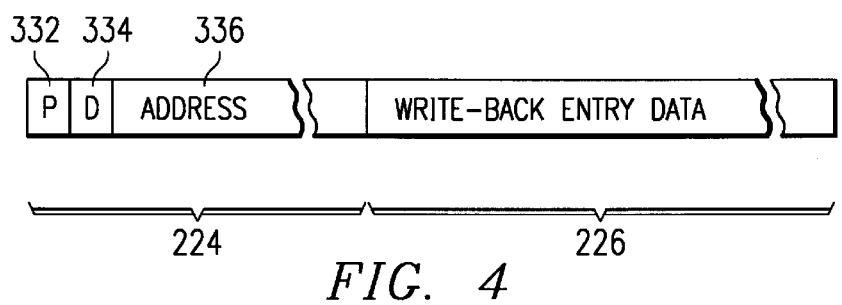
FIG. 4 illustrates the definition of write-back buffer bits according to a preferred embodiment of this invention.

FIG. 4 illustrates the definitions of the tags and address fields 224 and write-back buffer data 226 of a write-back buffer employed in this invention. Each write-back buffer entry within write-back buffer 220 includes a set of tags and address 224 and corresponding write-back buffer entry data 226. The preemptive write-back (P) field 332 preferably consists of a single bit. The preemptive write-back field 332 is set to 1 upon transfer of data from level 2 cache 114 to write-back buffer 220 for a preemptive cache write-back. The preemptive write-back field 332 is reset to 0 upon transfer of data from level 2 cache 114 to write-back buffer 220 for a normal eviction cache write-back. The preemptive write-back field 332 is used by control logic 222 in conjunction with control logic 214 to determine whether to flush a preemptive cache write-back entry in write-back buffer 220. This will be further described below. The write-back buffer entry may also include dirty field 334 of one or more dirty bits. If the dirty field 318 of the cache entry includes plural bits to mark sections of the cache entry data 218, then the write-back entry requires a copy of this field as dirty field 334. This could be used to enable write-back buffer 220 to write-back only the dirty part of the cache entry. Lastly, tags and address fields 224 further include address field 336 of the same type as address field 320 of each cache entry.

Figure 5:
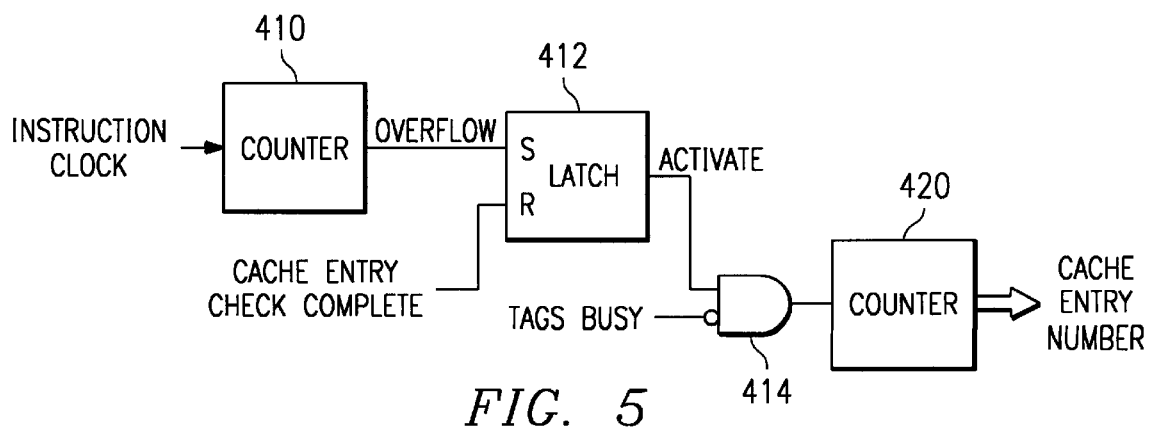
FIG. 5 illustrates construction of the timing portion of the preferred embodiment of the preemptive cache write-back logic of this invention.

Preemptive cache write-back logic 212 operates upon each entry within level 2 cache 114 on a periodic basis. According to the preferred embodiment of this invention, preemptive cache write-back logic 212 operates relatively infrequently. Operation upon the successive cache entries once every 500 to 4000 instruction cycles is believed sufficient. FIG. 5 illustrates a cache entry access circuit to access the level 2 cache 114. Counter 410 counts cycles of the instruction clock. Counter 410 has between 9 and 12 bits. Nine bits yields 512 instruction cycles between cache entry consideration. Twelve bits yields 4096 instruction cycles between cache entry consideration. Counter 410 generates an overflow signal that sets latch 412 each time it teaches its full count. When set latch 412 generates an activate signal. Additional instruction clock cycles cause counter 410 to roll over and count again from zero.

Ignoring for the moment AND gate 414, the activate signal of latch 412 supplies the count input of counter 420. Caches are typically constructed in sizes equal to an integral power of 2. The number of most significant bits within counter 420 corresponds to the least number of bits needed to encompass the number of cache entries. Wherever counter 420 counts it provides an incremented cache entry number. When the cache entry check operation completes, preemptive cache write-back logic 212 generates a cache entry check complete signal. This cache entry check complete signal resets latch 412. This enables latch 412 to again output the activate signal on the next overflow of counter 410. For each such cycle, counter 420 enables operation upon the next cache entry number. This continues until all cache entries are considered, then counter 420 rolls over to the first cache entry.

Referring back to AND gate 414, the activate signal output of latch 412 is supplied to a non-inverting input of AND gate 414. An inverting input of AND gate 414 receives a Tags Busy signal. The output of AND gate 414 supplies the count input of counter 420. There is a possibility that preemptive cache write-back logic 212 and control logic 214 will attempt to access the tags and addresses 216 of the same cache entry simultaneously. Control logic 216 detects a match between one more than the cache tag entry signal of counter 420 and the identity of the cache entry matching a current address. If this is the case, control logic 212 sends an active Tags Busy signal to preemptive cache write-back logic 212. The inverted Tags Busy signal closes AND gate 414 stopping the count operation of counter 420. At that same time, all other operations of preemptive cache write-back logic 212 also stall. Counting operation within counter 420 and operation of preemptive cache write-back logic 212 resumes when control logic 216 completes its access to the cache entry and deactivates the Tags Busy signal. Latch 412 retains its state during the time that the tags are busy, so that a count is not missed. The preemptive cache write-back operation is a background task, so this task waits for ordinary cache operations. Because preemptive cache write-back logic 212 operates so infrequently, any occasional such stalls will not adversely alter preemptive cache write-back operations. Note it is possible to construct the needed cache tags as dual ported memory to allow simultaneously access. Conflicts will occur infrequently and the consequences of stalling the preemptive cache write-back operation up to several instruction cycles will be infinitesimal. Therefore, the additional circuits for needed dual porting these cache tags are not justified.

Figure 6:
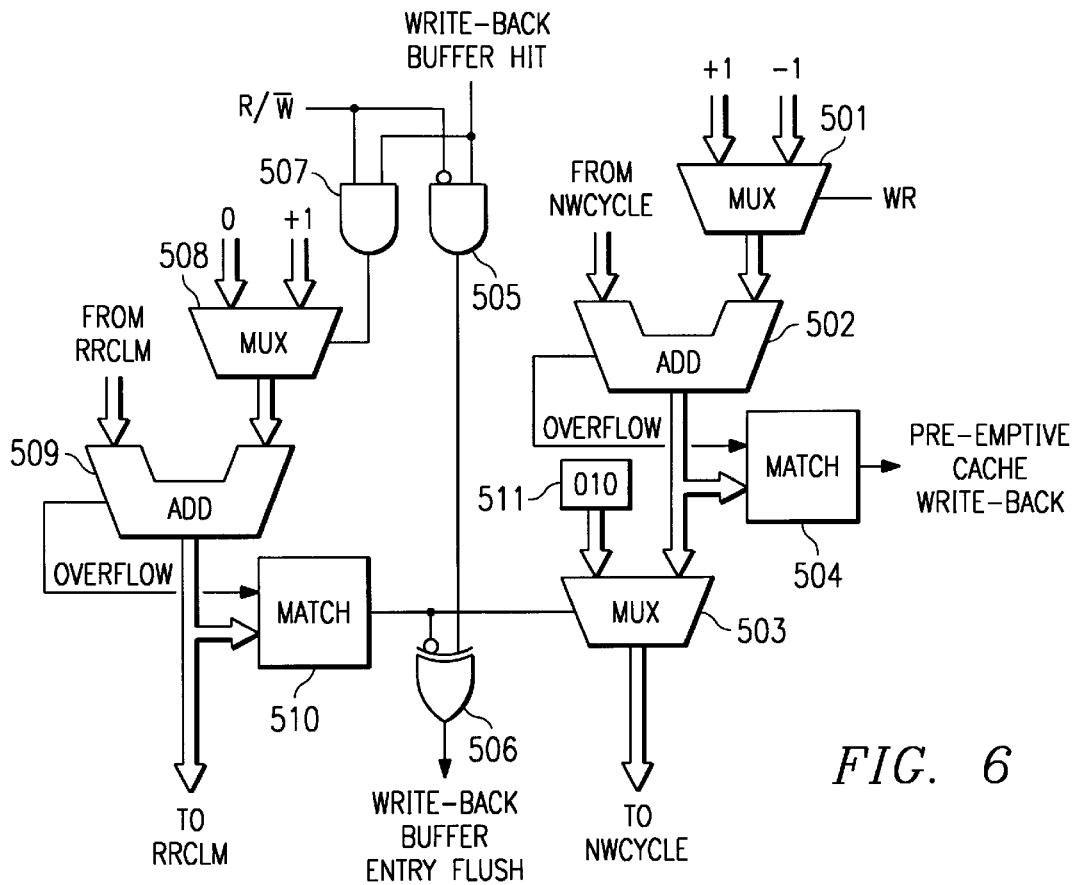
FIG. 6 illustrates construction of the tag handling portion of the preferred embodiment of the preemptive cache write-back logic of this invention.

FIG. 6 illustrates the construction of the operating parts of preemptive cache write-back logic 212. Preemptive cache write-back logic 212 includes multiplexer 501, adder 502, multiplexer 503, match circuit 504, AND gate 505, OR gate 506, AND gate 507, multiplexer 508, adder 509, match circuit 510, and 010 data register 511. Upon selection of the cache entry to be considered by the cache entry number output of counter 410, the data fields write field 312, nonwrite cycle field 314 and read reclaim field 316 are recalled and supplied to preemptive cache write-back logic 212. Preemptive cache write-back logic 212 also receives the write-back buffer hit signal from control logic 222 via control logic 214 and the read/not write signal from level 1 data cache 116d via control logic 214. Preemptive cache write-back logic 212 computes new values for nonwrite field 314, read reclaim field 316, which are stored in the corresponding cache entry. Preemptive cache write-back logic 212 also generates the write-back buffer entry flush signal that control logic 214 supplies to write-back buffer 220.

Note that the write field 312 is always reset to 0 each time a cache entry is considered by preemptive cache write-back logic 212. The circuit performing this function is omitted for brevity. Note also that the circuits illustrated in FIG. 6 operate upon normal consideration of cache entries and upon consideration of cache entries following a write-back buffer hit.

Multiplexer 501 is controlled by the write field 312 (WR). If the write field is 1 indicating that the cache entry has been written to since the last cycle, then multiplexer 501 selects its −1 data input. If the write field is 0 indicating that the cache entry has not been written to since the last cycle, then multiplexer 501 selects its +1 data input. Multiplexer 501 supplies one input to adder 502. The second input of adder 502 receives the value of the recalled nonwrite cycle field 314 (NWcycle). Recall that nonwrite cycle field 314 is preferably 2 or 3 its. Adder 502 forms a sum of a corresponding number of bits. Note that the minimum output of adder 502 is zero. Thus a plurality of successive write cycles cannot decrement the nonwrite cycle field 314 below zero. This is known as a saturating subtraction operation. Adder 502 supplies its sum output to one input of multiplexer 503. Multiplexer 503 generally selects this input to be stored in the nonwrite cycle field 314 of the corresponding cache entry. Thus generally the nonwrite field 314 is incremented if the cache entry has not been written to during the previous cycle and decremented if the cache entry has been written to during the previous cycle.

Match circuit 504 detects when the nonwrite cycle field 314 exceeds a predetermined amount. This occurs whenever the number of recent nonwrite cycles exceeds the number of recent write cycles by the predetermined amount. In the preferred embodiment, match circuit 504 detects the overflow condition of adder 502, indicating that the sum exceeds 7 (binary 111). Alternatively, match circuit 504 may be triggered whenever the sum output of adder 502 equals a particular number. When match circuit 504 detects its condition, it generates a preemptive cache write-back signal. This signals control logic 214 to copy the address and data of the corresponding cache entry to write-back buffer 220. Control logic 214 also signals control logic 222 to set the preemptive write-back field 332 (P) to 1. This enables write-back buffer 220 to handle a write-back buffer hit differently for preemptive write-backs than for normal cache line eviction write-backs. Once in the FIFO of write-back buffer 220, the cache entry will generally be written to main memory subsystem 105 via bus interface unit 112. It is known in the art that the amount of data within each write-back buffer entry may be a multiple of the data width between bus interface unit 112 and bus B to main memory subsystem 105. Bus interface unit 112 handles the buffering and sequencing of both reads and writes needed to compensate for this difference in data width in a manner known in the art. Control logic 214 may mark the corresponding cache entry as clean via dirty field 318 (D) upon copy to write-back buffer 220 or alternatively may wait until the actual write to main memory subsystem 105.

Preemptive cache write-back logic 212 generates the write-back buffer entry flush signal via AND gate 505 and OR gate 506. The write-back buffer hit signal from control logic 220 is supplied to a non-inverting input of AND gate 505 via control logic 214. An inverting input of AND gate 505 receives the read/not write signal (R/$\overline{W}$) from control logic 214. The AND gate 505 supplies one input to OR gate 506. Thus AND gate 505 and OR gate 506 generate an active write-back buffer entry flush signal upon detection of a write-back buffer hit when level 1 data cache 116d requests a write. As previously described, a hit to write-back buffer 220 upon a write means that the write-back buffer entry holds the wrong data to be written into main memory subsystem 105. Thus this write-back entry should be flushed and not written to main memory subsystem 105. Note that write-back buffer 220 can flush its entry for a hit on a preemptive write-back entry because this data is still stored in level 2 cache 114. This state is indicated by the P field 322. Thus level 2 cache 114 may respond the memory access normally though the cache entry is also in write-back buffer 220. If a write-back buffer hit occurs on a normal write-back corresponding to an evicted cache entry, this data must be transferred back to level 2 cache 114 before any processing can continue. In the case of an eviction, level 2 cache 114 no longer stores this data. Control logic 214 must store the returning write-back buffer entry and identify another cache entry to replace or evict. This process is known in the art and need not be further described.

The AND gate 507 also receives both the write-back buffer hit signal and the read/not write signal. Both these signals are supplied to non-inverting inputs. AND gate 507 generates an active signal upon receipt of the write-back buffer hit signal when level 1 data cache is making a read request. The corresponding write-back buffer entry may be flushed depending upon the number of read reclaims. The output of AND gate 507 controls the selection of multiplexer 508. If AND gate 507 generates an active output indicating receipt of a write-back buffer hit during a read access, then multiplexer 508 selects its +1 input signal. Otherwise, multiplexer 508 selects its 0 input signal. Multiplexer 508 supplies one input to adder 509. The second input of adder 509 receives the value of the recalled read reclaim field 316 (RRclm). Recall that read reclaim field 316 is preferably 1 or 2 bits. Adder 509 forms a sum of a corresponding number of bits. This sum is stored in the read reclaim field 316 of the corresponding cache entry. Generally this sum results in no change to read reclaim field 316, because multiplexer 508 generally selects its 0 input.

Match circuit 510 detects when the read reclaim field 316 exceeds a predetermined amount. This occurs whenever the number of read reclaims of the cache entry from write-back buffer 220 exceeds a predetermined amount. In the preferred embodiment, match circuit 510 detects the overflow condition of adder 509, indicating that the sum exceeds 3 (binary 11). Alternatively, match circuit 510 may be triggered whenever the sum output of adder 509 equals a particular number. When match circuit 510 detects its condition, it generates an active output signal. This signals supplies an inverting input of OR gate 506. Thus OR gate 506 generates the write-back buffer entry flush signal on read hits unless match circuit 510 detects its condition. This enables read reclaiming of data copied to write-back buffer 220 a predetermined number of times. Once this number is exceeded as detected by match circuit 510, then the write-back buffer entry is not flushed upon a read and is allowed to be written to main memory 105 via bus interface 112. Note that any write to a cache entry resets the read reclaim field 316 to 0. Thus read reclaim field 316 only reaches its limit on plural reads without an intervening write. In this case it may be best to write-back the cache entry on the assumption that microprocessor 110 is through writing to this address.

Match circuit 510 also controls the selection of multiplexer 503. Normally match circuit 510 controls multiplexer 503 to select the sum output of adder 502. When match circuit 510 generates an active signal, then multiplexer 503 selects its input from 010 register 511. This presets the nonwrite cycle count to 2 (binary 010) on each read reclaim from write-back buffer 220. Thus fewer read cycles are necessary to generate a preemptive cache write-back following a read reclaim.

Figure 7:
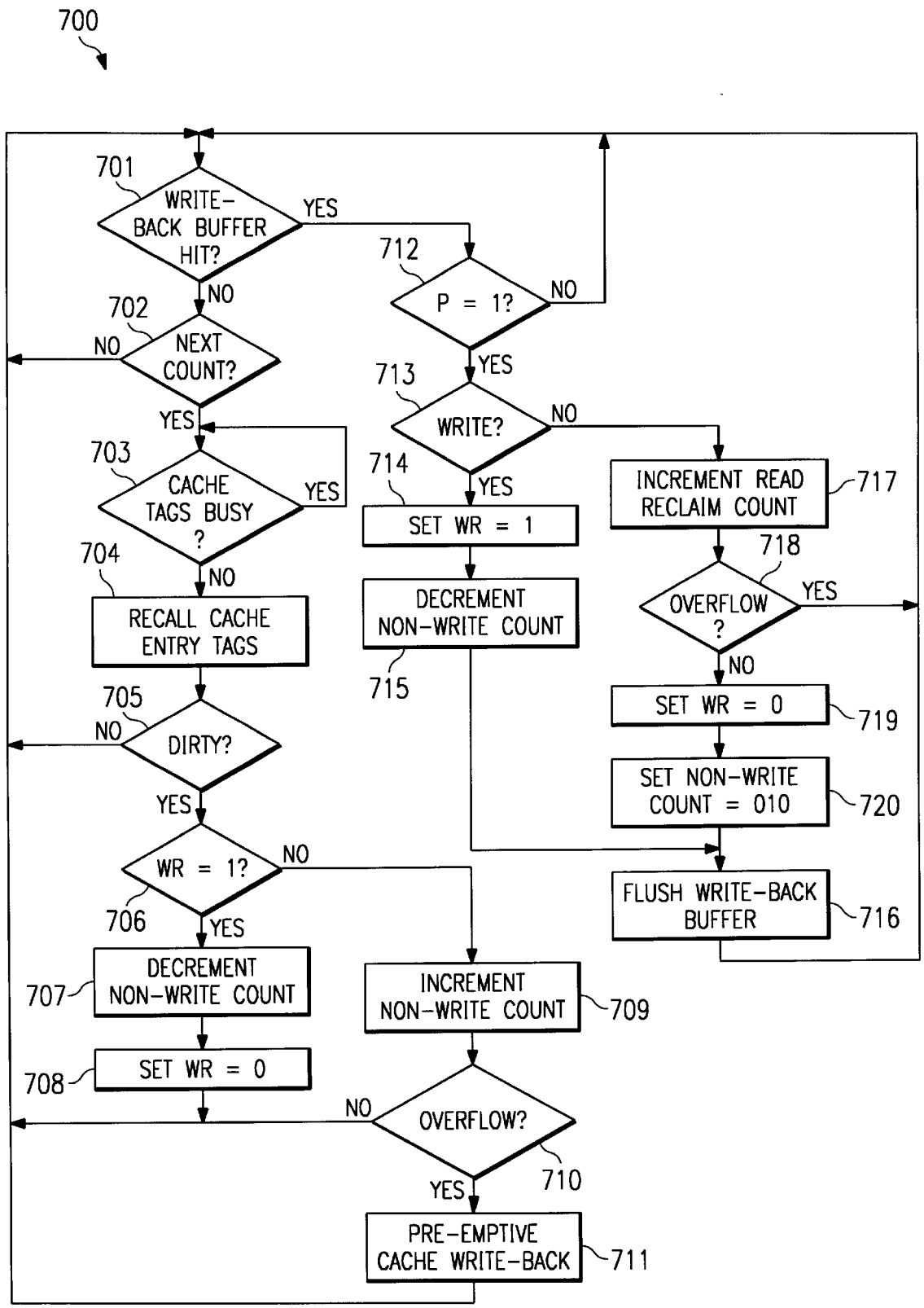
FIG. 7 illustrates in flow chart form the operation of the preferred embodiment of the preemptive cache write-back logic of this invention.

FIG. 7 illustrates in flow chart form the process steps enabling a preemptive cache write-back logic 212 in the form or an autonomous processor of state machine to embody this invention. Process 700 illustrated in FIG. 7 begins by detecting whether write-back buffer 220 generates a hit (decision block 701). If this is not true, process 700 tests to determine if counter 420 has reached a next count (decision block 702). If this is not true, then processor 700 returns to decision block 701. The process repeats these steps until one is satisfied.

Upon detection of a next count, process 700 tests to determine if the tags of the next cache entry to be considered are busy (decision block 703). This may happen occasionally when normal cache processes access the cache entry. Process 700 repeats the test of decision block 703 until the cache tags are not busy. Because the preemptive cache write-back is a background process, it waits until it does not conflict with other higher priority processes. Process 700 recalls the cache tags for the accessed cache entry (prossing block 704). These cache tags include write (WR) field 312, nonwrite cycle (NWcycle) field 314, read reclaim (RRclm) field 316 and dirty (D) field 318 illustrated in FIG. 3.

Process 700 next tests to determine if the accessed cache entry is dirty (decision block 705). No preemptive cache write-back is appropriate for a clean cache entry. Thus process 700 returns to decision block 701 if the cache entry is not dirty. If the cache entry is dirty, then process 700 tests to determine if the write field 312 is 1 (decision block 706). If the write field 312 is 1, then process 700 decrements the nonwrite cycle field 314 (processing block 707). As previously described, this is a saturating subtract, thus the nonwrite cycle field 314 cannot have a value less than zero. Process 700 then resets the write field 312 to 0 (processing block 708). The new values of both these fields are stored in the corresponding cache tags for the cache entry under consideration. Process 700 then returns to decision block 701 to loop until a write-back buffer hit (decision block 701) or the next count is reached (decision block 702). If the write field 312 is 0, then process 700 decrements the nonwrite cycle field 314 (processing block 709). Process 710 tests whether the incremented count exceeds a predetermined number (decision block 710). If the incremented count does not exceed the predetermined number, process 700 then returns to decision block 701 to loop until a write-back buffer hit (decision block 701) or the next count is reached (decision block 702). If the incremented count exceeds the predetermined number, then process 700 initiates a preemptive cache write-back of that cache entry (processing block 711). Process 700 then returns to decision block 701 to loop until a write-back buffer hit (decision block 701) or the next count is reached (decision block 702).

Upon detection of a write-back buffer hit (decision block 701), process 700 checks the P field 332 (decision block 712). As previously described, the P field 332 is set to 1 for preemptive cache write-backs and 0 for normal cache eviction write-backs. If the write-back buffer hit was on a normal cache eviction write-back entry, then processor 700 returns to the initial loop of decision blocks 701 and 702. If the write-back buffer hit was on a preemptive write-back buffer entry, process 700 tests to determine if the memory access is a write (decision block 713). If the memory access generating the write-back buffer hit is a write, then process 714 sets the write field 312 to 1 (processing block 714) and decrements the nonwrite cycle field 314 (processing block 715). Thereafter the write-back buffer entry is flushed (processing block 716). Note that since this is a preemptive write-back buffer entry the corresponding data is still stored in level 2 cache 114. Thus the write-back buffer 220 does not need to copy this data back to the cache. In fact level 2 cache 114 may service the write memory access normally while write-back buffer 220 flushes this entry. Once the write-back buffer entry is flushed, process 700 returns to the initial loop.

If the memory access generating the write-back buffer hit is a read, then process 714 increments the read reclaim field 316 (processing block 717). Process 700 then tests to determine if the read reclaim field 316 exceeds its predetermined number (decision block 718). If this is true, then the write-back buffer entry is not flushed and process 700 returns to the initial loop. If the read reclaim field 316 does not exceed its predetermined number, then process 700 sets the write field 312 to 0 (processing block 719) and sets the nonwrite cycle field 314 to 010 (processing block 720). Thereafter the write-back buffer entry is flushed (processing block 716). Once the write-back buffer entry is flushed, process 700 returns to the initial loop.

Figure 8:
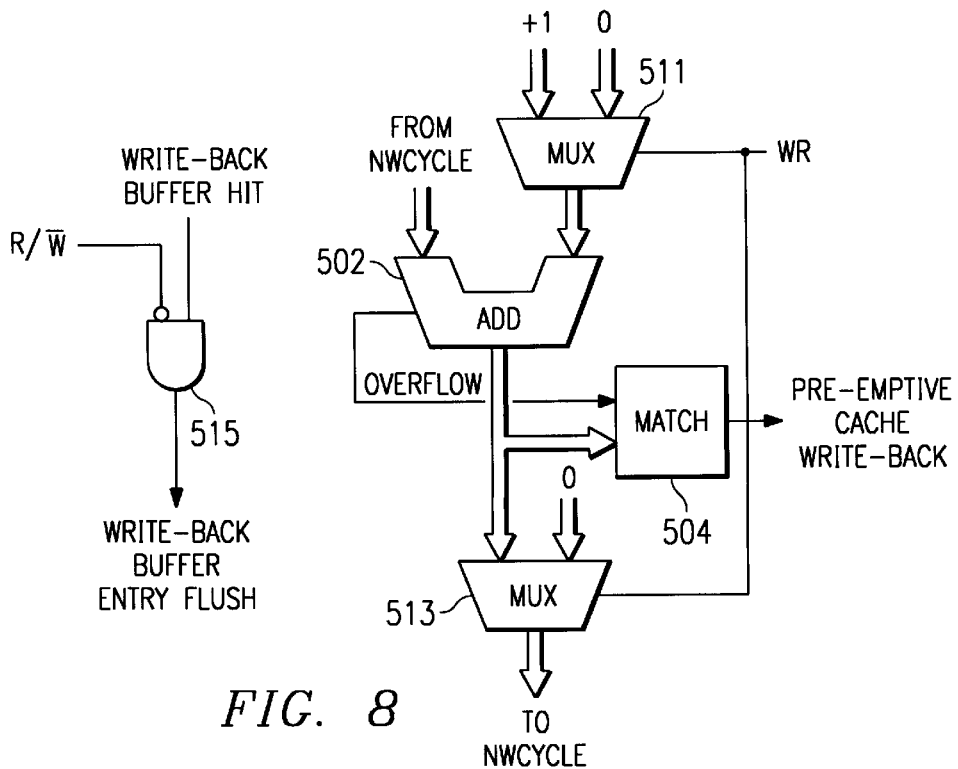
FIG. 8 illustrates construction of an alternative embodiment of the tag handling portion of the preemptive cache write-back logic of this invention.

FIG. 8 illustrates the construction of the operating parts of preemptive cache write-back logic 212 according to an alternative embodiment. In this alternative embodiment a write to the cache entry resets the nonwrite cycle field 212 to zero and read reclaims from write-back buffer 220 are not supported. Preemptive cache write-back logic 212 includes multiplexer 511, adder 502, multiplexer 513, match circuit 504 and AND gate 515. Upon selection of the cache entry to be considered by the cache entry number output of counter 410, the data fields write field 312 and nonwrite cycle field 314 are recalled and supplied to preemptive cache write-back logic 212. The read reclaim field 316 is not supported in this alternative embodiment. Preemptive cache write-back logic 212 also receives the write-back buffer hit signal from control logic 222 via control logic 214 and the read/not write signal from level 1 data cache 116d via control logic 214. Preemptive cache write-back logic 212 computes a new value for nonwrite field 314, which is stored in the corresponding cache entry. Preemptive cache write-back logic 212 also generates the write-back buffer entry flush signal that control logic 214 supplies to write-back buffer 220.

Multiplexer 511 is controlled by the write field 312 (WR). If the write field is 1 indicating that the cache entry has been written to since the last cycle, then multiplexer 511 selects its 0 data input. If the write field is 0 indicating that the cache entry has not been written to since the last cycle, then multiplexer 511 selects its +1 data input. Multiplexer 511 supplies one input to adder 502. The second input of adder 502 receives the value of the recalled nonwrite cycle field 314 (NWcycle). Adder 502 supplies its sum output to one input of multiplexer 513. Multiplexer 513 generally selects this sum input if the write field 312 is 0. Multiplexer 513 selects its 0 input if the write field 312 is 1. Thus write field 312 increments when there has been no write for the previous cycle and is reset to 0 if there has been at least one write.

Match circuit 504 detects when the nonwrite cycle field 314 exceeds a predetermined amount. This occurs whenever the number of consecutive nonwrite cycles exceeds the predetermined amount. When match circuit 504 detects its condition, it generates a preemptive cache write-back signal. This occurs as previously described.

Preemptive cache write-back logic 212 generates the write-back buffer entry flush signal via AND gate 515. The write-back buffer hit signal from control logic 220 is supplied to a non-inverting input of AND gate 515 via control logic 214. An inverting input of AND gate 515 receives the read/not write signal (R/$\overline{\text{W}}$) from control logic 214. The AND gate 515 supplies an active write-back buffer entry flush signal upon detection of a write-back buffer hit when level 1 data cache 116*d* requests a write.

What is claimed is:

1. A method of preemptive cache write-back in a microprocessor having an internal cache comprising the steps of:
   maintaining a write history for each cache entry;
   checking each cache entry once each predetermined time period to determine if the cache entry is dirty indicating the cache entry has been written to since a last write of the cache entry to main memory;
   if a cache entry has been determined to be dirty, checking the write history of the dirty cache entry to determine if the dirty cache entry is stale indicating it is unlikely to be written to in the near future;
   if the dirty cache entry is stale, writing the dirty cache entry to main memory, retaining the dirty cache entry within the cache and marking the dirty cache entry as clean indicating the cache entry has not been written to since a last write of the cache entry to main memory.

2. The method of preemptive cache write-back of claim 1, wherein:
   said step of maintaining a write history for each cache entry includes
      counting a number of consecutive predetermined time periods during which there is no write to the dirty cache entry, and
   said step of checking the write history to determine if the dirty cache entry is stale includes
      determining said dirty cache entry is stale if the count exceeds a predetermined number.

3. The method of preemptive cache write-back of claim 1, wherein:
   said step of maintaining a write history for each cache entry includes
      setting a corresponding nonwrite count to zero upon each initiation of a cache entry,
      setting a write bit corresponding to the cache entry upon each write to the cache entry,
      upon each checking the write history incrementing the nonwrite count if the corresponding write bit is not set, decrementing the nonwrite count if the corresponding write bit is set and thereafter resetting the corresponding write bit, and
   said step of checking the write history to determine if the dirty cache entry is stale includes
      determining said dirty cache entry is stale if the nonwrite count exceeds a predetermined number.

4. The method of preemptive cache write-back of claim 1, wherein:
   said step of maintaining a write history for each cache entry includes
      setting a corresponding nonwrite count to zero upon each initiation of a cache entry,
      setting a write bit corresponding to the cache entry upon each write to the cache entry,
      upon each checking the write history incrementing the nonwrite count if the corresponding write bit is not set, resetting the nonwrite count to zero if the corresponding write bit is set and thereafter resetting the corresponding write bit, and
   said step of checking the write history to determine if the dirty cache entry is stale includes
      determining said dirty cache entry is stale if the nonwrite count exceeds a predetermined number.

5. The method of preemptive cache write-back of claim 1, wherein:
   said step of writing the dirty cache entry to main memory includes
      writing the dirty cache entry and its corresponding address to a first entry of a first-in-first-out write-back buffer, and
      writing a final entry of the write-back buffer to main memory whenever the main memory is free to accept writes.

6. The method of preemptive cache write-back of claim 5, wherein:
   said step of marking the dirty cache entry as clean includes marking the dirty cache entry as clean upon writing the dirty cache entry and its corresponding address to the write-back buffer.

7. The method of preemptive cache write-back of claim 6, further comprising:
   comparing a write address of each write with the corresponding addresses of each entry in the write-back buffer,
   if the write address matches the corresponding address of any entry within the write-back buffer, flushing the matching entry from the write-back buffer and remarking the corresponding dirty cache entry as dirty.

8. The method of preemptive cache write-back of claim 5, wherein:
   said step of marking the dirty cache entry as clean includes marking the dirty cache entry as clean upon the write-back buffer writing the dirty cache entry to the main memory.

9. The method of preemptive cache write-back of claim 8, further comprising:
   comparing a write address of each write to the cache with the corresponding addresses of each entry in the write-back buffer,
   if the write address matches the corresponding address of any entry within the write-back buffer, flushing the matching entry from the write-back buffer.

10. The method of preemptive cache write-back of claim 5, further comprising:
    setting a read reclaim count corresponding to each cache entry to zero upon initialization of the cache entry and upon each write to the cache entry;
    comparing a read address of each read from the cache with the corresponding addresses of each entry in the write-back buffer,
    if the read address matches the corresponding address of any entry within the write-back buffer
      incrementing the read reclaim count,
      checking to determine if the read reclaim count exceeds a second predetermined number, and
      if and only if the read reclaim count does not exceed the second predetermined number, flushing the matching entry from the write-back buffer.

11. The method of preemptive cache write-back of claim 10, wherein:
    said step of maintaining a write history for each cache entry includes
      setting a corresponding nonwrite count to zero upon each initiation of a cache entry,
      setting a write bit corresponding to the cache entry upon each write to the cache entry,
      upon each checking the write history incrementing the nonwrite count if the corresponding write bit is not set, decrementing the nonwrite count if the corresponding write bit is set and thereafter resetting the corresponding write bit, said step of checking the write history to determine if the dirty cache entry is stale includes
  determining said dirty cache entry is stale if the nonwrite count exceeds a predetermined number; and
 wherein the method further includes setting said nonwrite count to a third predetermined number greater than zero and less than said predetermined number if said read reclaim count exceeds said second predetermined number.

12. The method of preemptive cache write-back of claim 5, wherein:
 said step of maintaining a write history for each cache entry includes
  setting a corresponding nonwrite count to zero upon each initiation of a cache entry,
  setting a write bit corresponding to the cache entry upon each write to the cache entry,
  upon each checking the write history incrementing the nonwrite count if the corresponding write bit is not set, resetting the nonwrite count to zero if the corresponding write bit is set and thereafter resetting the corresponding write bit,
 said step of checking the write history to determine if the dirty cache entry is stale includes
  determining said dirty cache entry is stale if the nonwrite count exceeds a predetermined number; and
 wherein the method further includes setting said nonwrite count to a third predetermined number greater than zero and less than said predetermined number if said read reclaim count exceeds said second predetermined number.

13. The method of preemptive cache write-back in a microprocessor of claim 1, wherein:
 said step of checking each cache entry once each predetermined time period consists of
  once each predetermining time period stalling operation of the microprocessor,
  thereafter sequentially checking all cache entries, and thereafter resuming operation of the microprocessor.

14. The method of preemptive cache write-back in a microprocessor of claim 1, wherein:
 said predetermined time period is determined by counting a predetermined number of instruction cycles of the microprocessor.

15. The method of preemptive cache write-back in a microprocessor of claim 1, wherein:
 said step of checking each cache entry once each predetermined time period consists of
  counting each instruction cycle of the microprocessor,
  upon each counting of a predetermined number of instruction cycles checking a next sequential cache entry, the predetermined number of instruction cycles selected with regard to the number of cache entries thereby permitting each cache entry to be checked within said predetermined time period.

16. The method of preemptive cache write-back in a microprocessor of claim 15, further comprising:
 upon each counting of a predetermined number of instruction cycles checking to determine if the microprocessor is reading from or writing to said next sequential cache entry and if so stalling the cache entry check until the microprocessor is neither reading from nor writing to said next sequential cache entry.

17. A microprocessor comprising:
 an internal cache memory having a plurality of cache entries, each cache entry having
  cache data,
  an address field indicating where said cache data is stored in a main memory,
  at least one dirty bit indicating corresponding portions of said cache data have been written to since a last time said cache data was written to the main memory,
  a write bit indicating said cache entry has been written to, and
  a nonwrite cycle field of a plurality of bits; a preemptive cache write-back logic connected to said cache memory including
   a cache entry access circuit for accessing said at least one dirty bit, said write bit and said nonwrite cycle field of each cache entry in a predetermined sequence,
   an adder operative if said at least one dirty bit indicates any corresponding portion of said cache data is dirty, said adder having a first input receiving said nonwrite cycle field of said accessed cache entry, a second input receiving a +1 input if said write bit is set and an output producing a sum of said first and second inputs, said sum replacing said nonwrite cycle field of said accessed cache entry,
   a match circuit connected to said adder for indicating if said sum exceeds a predetermined number; and
   a write-back means for writing at least said portions of said cache data indicated dirty by said at least one dirty bit of said accessed cache entry to the main memory at an address corresponding to said address field of said accessed cache entry if said match circuit indicates said sum exceeds said predetermined number.

18. The microprocessor of claim 17, wherein:
 said preemptive cache write-back circuit further includes
  a multiplexer having a first input receiving a +1, a second input receiving a −1, a control input receiving said write bit and an output connected to said second input of said adder, said multiplexer selecting said 1 at said first input if said write bit is set and selecting said +1 at said second input if said write bit is not set.

19. The microprocessor of claim 17, wherein:
 said preemptive cache write-back circuit further includes
  a first multiplexer having a first input receiving a +1, a second input receiving a 0, a control input receiving said write bit and an output connected to said second input of said adder, said multiplexer selecting said +1 at said first input if said write bit is set and selecting said 0 at said second input if said write bit is not set,
  a second multiplexer having a first input receiving said sum of said adder, a second input receiving a 0, a control input receiving said write bit and an output replacing said nonwrite cycle field of said access cache entry, said multiplexer selecting said 0 at said first input if said write bit is set and selecting said sum of said adder at said second input if said write bit is not set.

20. The microprocessor of claim 17, further comprising:
 a first-in-first-out write-back buffer having an input receiving cache entry data to be written to the main memory and said corresponding address and an output writing to the main memory whenever the main memory is free to accept writes.

21. The microprocessor of claim 20, wherein:

said preemptive cache write-back logic marks said cache entry as clean upon writing said cache entry and its corresponding address to said write-back buffer.

22. The microprocessor of claim 21, wherein:

said write-back buffer
- includes a preemptive write-back bit set upon copying a cache entry and its corresponding address for a preemptive write-back and reset upon copying a cache entry and its corresponding address for a cache entry eviction,
- compares a write address of each memory write with the corresponding addresses of each entry in said write-back buffer, and
- if the write address matches the corresponding address of any entry within the write-back buffer and said preemptive write-back bit is set, flushing the matching entry from the write-back buffer; and said preemptive cache write-back logic remarks as dirty said cache entry corresponding to said flushed write-back buffer entry.

23. The microprocessor of claim 20, wherein:

said preemptive cache write-back logic marks said cache entry as clean upon the write-back buffer writing a corresponding write-back buffer entry to the main memory.

24. The microprocessor of claim 23, wherein:

said write-back buffer
- includes a preemptive write-back bit set upon copying a cache entry and its corresponding address for a preemptive write-back and reset upon copying a cache entry and its corresponding address for a cache entry eviction,
- compares a write address of each write with the corresponding addresses of each entry in said write-back buffer, and
- if the write address matches the corresponding address of any entry within the write-back buffer, flushing the matching entry from the write-back buffer.

25. The microprocessor of claim 20, wherein:

said cache entry further includes a read reclaim field set to zero upon initialization of said cache entry and upon each write to said cache entry;

said write-back buffer
- includes a preemptive write-back bit set upon copying a cache entry and its corresponding address for a preemptive write-back and reset upon copying a cache entry and its corresponding address for a cache entry eviction,
- compares a read address of each memory read with said corresponding addresses of each entry in said write-back buffer, said preemptive cache write-back logic further includes
- a second multiplexer having a first input receiving a 0, a second input receiving a +1, a control input connected to said write-back buffer, said multiplexer selecting said 0 at said first input if said write-back buffer does not detect a match between said read address and any corresponding address of a write-back buffer entry whose preemptive write-back bit is set and selecting said +1 at said second input if said write-back buffer detects a match between said read address and any corresponding address a write-back buffer entry,
- a second adder having a first input receiving said read reclaim field of said accessed cache entry, a second input connected to said output of said second multiplexer and an output producing a second sum of said first and second inputs, said second sum replacing said read reclaim field of said accessed cache entry,
- a second match circuit connected to said second adder for indicating if said second sum exceeds a second predetermined number, and said write-back buffer flushing the matching entry from the write-back buffer if said second match circuit indicates said second sum exceeds said second predetermined number.

26. The microprocessor of claim 25, wherein:

said preemptive cache write-back logic further includes
- a third multiplexer having a first input receiving said sum output of said adder, a second input receiving a third predetermined number greater than zero and less than said predetermined number, a control input connected to said second match circuit and an output selecting sum output at said first input if said second match circuit indicates said second sum does not exceed said second predetermined number and said third predetermined number at said second input if said second match circuit indicates said second sum exceeds said second predetermined number.

27. The microprocessor of claim 17, wherein:

said cache entry access circuit includes
- a first counter having a predetermined number of bits, a count input receiving an instruction clock for counting instruction cycles and an output generating an overflow signal up reaching a full count, and
- a second counter counting having a count input receiving said overflow signal of said first counter and an output outputting a count for accessing a corresponding cache entry.

28. The microprocessor of claim 27, wherein:

said cache entry access circuit includes
- an AND gate having a first noninverting input receiving said overflow signal, a second inverting input receiving a tags busy signal indicating cache access to a cache entry corresponding to one more than said count of said second counter and an output connected to said count input of said second counter.

* * * * *